Patented June 16, 1953

2,642,412

UNITED STATES PATENT OFFICE 2,642,412

CURING GLYCIDYL POLYETHERS WITH N,N-DIALKYL-1,3-PROPANEDIAMINES

Herbert A. Newey, Lafayette, and Edward C. Shokal, Walnut Creek, Calif., assignors to Shell Development Company, Emeryville, Calif., a corporation of Delaware No Drawing. Application August 7, 1951, Serial No. 240,794

8 Claims. (Cl. 260—47)

This invention relates to a process of curing a glycidyl polyether to a hard tough resinous product with a particularly advantageous special class of amino curing agents.

Glycidyl polyethers have been heretofore subjected to cure with various basic substances including some amines. We have now discovered that markedly improved cure of glycidyl polyethers having a 1,2-epoxy equivalency greater than 1.0 is obtained with the aid of a special class of amino curing agents.

The amino curing agent employed in the process of our inventon is an N,N-dialkyl-1,3-propanediamine. Because of outstanding performance, it is preferred to utilize N,N-dimethyl-1,3-propanediamine or N,N-diethyl-1,3-propanediamine, i. e., an N,N-dialkyl-1,3-propanediamine wherein the alkyl groups contain 1 to 2 carbon atoms. Other members of the class which may be used include the corresponding compounds wherein the alkyl groups are propyl, butyl, isobutyl, amyl, 2-ethylhexyl, stearyl and like aliphatic saturated hydrocarbon groups of any number of carbon atoms. If desired, the curing agent may contain two different alkyl groups as is the case with N-methyl-N-ethyl-1,3-propanediamine, N-methyl-N-butyl-1,3-propanediamine, and like compounds containing mixed alkyl groups. The N,N-dialkyl-1,3-propanediamines can be prepared by reacting a mol of beta-chloropropionitrile with two mols of the desired dialkylamine (the alkyl groups being the same or different) by the method described in Bull. Acad. roy. Belg., 904 (1904), and then converting the nitrile group of the resulting product to an amino group by hydrogenation according to one of the methods described in U. S. Patents Nos. 2,165,515, 2,429,876 and 2,436,368.

According to the method of the invention, glycidyl polyether having a 1,2-epoxy equivalency greater than 1.0 is converted to a resin by adding and mixing therewith an N,N-dialkyl-1,3-propanediamine in amount of about 0.05 to 1 mol of the amine per epoxide equivalent weight of the polyether, the cure being effected at about room temperature (about 20° C.) to 250° C. The manner in which the stated diamine functions as curing agent is not fully understood. It appears to act partly as a catalyst which causes molecules of the glycidyl polyether to couple by chemical bonding with other glycidyl polyether molecules and with already coupled molecules thereof, and partly as a reactant which also couples chemically with molecules of the glycidyl polyether. In any event, it causes a very tight and complete cure of the composition to be obtained. As compared with amine curing agents known heretofore, action of the N,N-dialkyl-1,3-propanediamines is unique in view of the unexpected tightness of cure with rapidity. Furthermore, we have found that the character of the formed resin is critically related to the proportion of the amine employed to cure the glycidyl polyether. If more than about one mole of the diamine per epoxide equivalent weight of the glycidyl polyether is used, the resulting product is soluble in organic solvents. By employing not more than a one mol proportion, a hard resinous product is obtained which is not soluble in organic solvents of which toluene is typical. The use of less than about an 0.05 mol proportion is insufficient to enable a tight cure to be obtained. The process of the invention thus embraces mixing from about 0.05 to 1 mol of the diamine per epoxide equivalent weight of the glycidyl polyether. Best results have been obtained by employing about an 0.15 to 0.4 mol proportion.

The temperature of cure is not a controlling factor in the process other than its relation to the time needed to effect the desired complete cure. Cure is obtained at room temperature (about 20° C.) without heating, but the time to obtain a hard resin will be longer than at elevated temperatures. Although various elevated temperatures are suitable, care is taken that the employed temperature is not so high that charring of the resinous product occurs. Temperatures within the range of about 20° C. to 250° C. are employed, and preferably only up to about 150° C.

The glycidyl polyethers employed in the invention are obtainable from reaction of epichlorhydrin and polyhydric phenols or alcohols in an alkaline medium. There is preferably used glycidyl polyether of a polyhydric phenol, including pyrogallol and phloroglucinol, but particularly of a dihydric phenol. Such polyethers are obtained by heating the dihydric phenol with epichlorhydrin at about 50° C. to 150° C. using 1 to 2 or more mols of epichlorhydrin per mol of dihydric phenol. Also present is a base, such as sodium or potassium hydroxide in slight stoichiometric excess to the epichlorhydrin, i. e., about 2% to 30%. The heating is continued for several hours to effect the reaction and the product is then washed free of salt and base. The product, instead of being a single simple compound, is generally a complex mixture of glycidyl polyethers, but the principal product may be represented by the formula

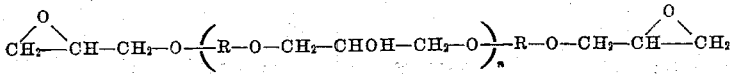

wherein $n$ is an integer of the series 0, 1, 2, 3 . . ., and R represents the divalent hydrocarbon radical of the dihydric phenol. While for any single molecule of the polyether $n$ is an integer, the fact that the obtained polyether is a mixture of compounds causes the determined value for $n$, e. g., from molecular weight measurement, to be an average which is not necessarily zero or a whole number. Although the polyether is a substance primarily of the above formula, it may contain some material with one or both of the terminal glycidyl radicals in hydrated form.

The simplest of such polyethers is the diglycidyl diether of a dihydric phenol. It contains a single divalent aromatic hydrocarbon radical from the dihydric phenol and has two glycidyl radicals linked thereto by ethereal oxygen atoms. More generally, the polyether of dihydric phenols is of more complex character and contains two or more aromatic hydrocarbon radicals alternating with glyceryl groups in a chain which are linked together by intervening ethereal oxygen atoms.

The glycidyl polyethers used in the invention have a 1,2-epoxy equivalency greater than 1.0. By the epoxy equivalency reference is made to the average number of 1,2-epoxy groups

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2 even when derived from a dihydric phenol or alcohol. However, in all cases it is a value greater than 1.0. The 1,2-epoxy equivalency of the polyethers of dihydric compounds is a value between 1.0 and 2.0.

The 1,2-epoxide value of the glycidyl polyether is determined by heating a weighed sample of the ether with an excess of 0.2 N pyridinium chloride in chloroform solution at the boiling point under reflux for two hours whereby the pyridinium chloride hydrochlorinates the epoxy groups to chlorhydrin groups. After cooling, the excess pyridinium chloride is back-titrated with 0.1 N sodium hydroxide in methanol to the phenolphthalein end point. This method is used for obtaining all epoxide values discussed herein. By the term epoxide equivalent weight reference is made to the weight of glycidyl polyether which contains and is equivalent to one 1,2-epoxy group. For example, the glycidyl polyether of 2,2-bis(4-hydroxyphenyl)propane designated herein as Polyether A, has a measured epoxy value of 0.50 epoxy equivalents per 100 grams and a measured molecular weight of 370. The 1,2-epoxy equivalency of Polyether A is, therefore, 1.85 and the epoxide equivalent weight is 200.

Any of the various dihydric phenols is used in preparing the polyethers including mononuclear phenols such as resorcinol, catechol, hydroquinone, methyl resorcinol, etc.; or polynuclear phenols like 2,2-bis(4-hydroxyphenyl)propane which is termed bis-phenol herein for convenience, 4,4' - dihydroxybenzophenone, bis(4 - hy-

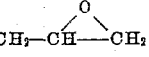

droxyphenyl)methane, 1,1 - bis(4 - hydroxyphenyl)ethane, 1,1 - bis(4 - hydroxyphenyl)isobutane, 2,2-bis(4-hydroxyphenyl)butane, 2,2-bis(4 - hydroxy - 2 - methylphenyl)propane, 2,2,-bis(4 - hydroxy - 2 - tertiary - butylphenyl)propane, 2,2-bis(2-hydroxynaphthyl)pentane, 1,5-dihydroxynaphthalene, etc.

Preferred polyethers are prepared from 2,2-bis(4 - hydroxyphenyl)propane. They contain a chain of alternating glyceryl and 2,2-bis(4-phenylene)propane radicals separated by intervening ethereal oxygen atoms and have a 1,2-epoxy equivalency between 1.0 and 2.0, a molecular weight of about 340 to 624, and an epoxide equivalent weight of about 175 to 400.

Also suitable for use in the invention are glycidyl polyethers of polyhydric alcohols. Because they contain a plurality of glycidyl groups such substances are capable of curing in the same manner as that of the glycidyl polyethers of polyhydric phenols. Among representative compounds of this class are diglycidyl ethers of ethylene glycol, propylene glycol, trimethylene glycol, butylene glycol, diethylene glycol, triethylene glycol, glycerol, tripropylene glycol, and the like, as well as ethers containing more than two glycidyl groups such as the glycidyl polyethers of glycerol, diglycerol, erythritol, pentaglycerol, pentaerythritol, mannitol, sorbitol, polyallyl alcohol, polyvinyl alcohol, and the like. Such glycidyl polyethers also have a 1,2-epoxy value greater than 1.0.

The glycidyl polyethers of the polyhydric alcohols are preferably prepared by reacting the polyhydric alcohol with epichlorhydrin in the presence of 0.1 to 2% of an acid-acting compound as catalyst such as boron trifluoride, hydrofluoric acid or stannic chloride whereby the chlorhydrin ether is formed as product. The reaction is effected at about 50° C. to 125° C. with the proportions of reactants being such that there is about one mol of epichlorhydrin for each molecular equivalent of hydroxyl group in the polyhydric alcohol. Thus, in preparing the ether of diethylene glycol, which glycol contains two hydroxyl groups in each molecule thereof, about two mols of epichlorhydrin for each mol of diethylene glycol are used. The resulting chlorhydrin ether from the reaction of a polyhydric alcohol with epichlorhydrin is dehydrochlorinated by heating at about 50° C. to 125° C. with a small, say 10%, stoichiometrical excess of a base. For this purpose, sodium aluminate gives good results.

The glycidyl polyethers will be more fully understood from consideration of the following described preparations and the properties of the products.

POLYETHER A

Bis-phenol is dissolved in epichlorhydrin in the proportion of 5,130 parts (22.5 mols) of bisphenol in 20,812 parts (225 mols) of epichlorhydrin and 104 parts of water. The solution is prepared in a kettle provided with heating and cooling equipment, agitator, distillation condenser and receiver. A total of 1880 parts of solid 97.5% sodium hydroxide, corresponding to 2.04 mols of sodium hydroxide per mol of bisphenol (2% excess) is added in installments.

The first installment of 300 parts of sodium hydroxide is added and the mixture heated with efficient agitation. The heating is discontinued as the temperature reaches 80° C. and cooling is started in order to remove the exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction, the excess epichlorhydrin is removed by vacuum distillation with use of a kettle temperature up to 150° C. and a pressure of 50 mm. Hg. After completion of the distillation, the residue is cooled to about 90° C. and about 360 parts of benzene added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting glycidyl polyether of bis-phenol has a Durrans' mercury method softening point of 9° C., an average molecular weight of 370 by ebuilloscopic measurement in ethylene dichloride, and an epoxide value of 0.50 epoxy equivalents per 100 grams. It has an epoxide equivalent weight of 200 and a 1,2-epoxy equivalence of 1.85. The product is designated herein as Polyether A.

POLYETHER B

A solution consisting of 11.7 parts of water, 1.22 parts of sodium hydroxide, and 13.38 parts of bis-phenol is prepared by heating the mixture of ingredients to 70° C. and then cooling to 46° C. at which temperature 14.06 parts of epichlorhydrin are added while agitating the mixture. After 25 minutes has elapsed, there is added during an additional 15 minutes' time a solution consistsing of 5.62 parts of sodium hydroxide in 11.7 parts of water. This causes the temperature to rise to 63° C. Washing with water at 20° C. to 30° C. temperature is started 30 minutes later and continued for 4½ hours. The product is dried by heating to a final temperature of 140° C. in 80 minutes, and cooled rapidly. At room temperature, the product is an extremely viscous, semi-solid having a softening point of 27° C. by Durrans' mercury method, an epoxide equivalent weight of 245 and a molecular weight of 460. The 1,2-epoxy equivalency is 1.88. This product will be referred to hereinafter as Polyether B.

POLYETHER C

Polyethers of higher molecular weight are prepared by using smaller ratios of epichlorhydrin to bis-phenol. In a vessel fitted with an agitator, 228 parts (1 mol) of bis-phenol and 86 parts (2.14 mols) sodium hydroxide as a 10% aqueous solution are introduced and heated to about 45° C. whereupon 188 parts (2.04 mols) of epichlorhydrin are added rapidly while agitating the mixture. The temperature of the mixture is then gradually increased and maintained at about 95° C. for 80 minutes. The mixture separates into a two-phase system and the aqueous layer is drawn off from the taffy-like product which forms. The latter is washed with hot water while molten until the wash water is neutral to litmus. The product is then drained and dried by heating to a final temperature of 130° C. The softening point of the resulting glycidyl polyether is 43° C. The measured molecular weight of the product is 520 and it has an epoxide value of 0.29 epoxy equivalent per 100 grams. The epoxide equivalent weight is 345 and the 1,2-epoxy equivalency is 1.8. It will be identified hereinafter as Polyether C.

POLYETHER D

This glycidyl polyether is prepared in like manner to that of Polyether C except that for each mol of bis-phenol there is employed 1.22 mols of epichlorhydrin and 1.37 mols of sodium hydroxide. The resulting polyether has a softening point of 98° C. by Durrans' mercury method, a molecular weight of 1400 as measured ebulliscopically in ethylene dichloride, and an epoxide value of 0.11 epoxy equivalents per 100 grams. The expoxide equivalent weight is 910, and the 1,2-epoxy equivalency is 1.54.

POLYETHER E

Glycidyl polyethers of still higher molecular weight are most easily prepared by heating together and reacting a lower polyether with additional dihydric phenol. 100 parts of polyether D are heated to 150° C., and then 5 parts of bis-phenol are added. The heating is continued for about two hours while stirring the reaction mass and gradually increasing the temperature to about 200° C. The resulting product has a softening point of 131° C., a molecular weight of 2900, an epoxy value of 0.05 epoxy equivalents per 100 grams, an epoxide equivalent weight of 2000, and a 1,2-epoxy equivalency of 1.45.

POLYETHER F

Preparation of the glycidyl polyethers of polyhydric alcohols may be illustrated by considering preparation of the glycidyl polyether of glycerol, a typical member of the group.

In parts by weight, about 276 parts of glycerol (3 mols) are mixed with 828 parts of epichlorhydrin (9 mols). To this reaction mixture are added 10 parts of a diethyl ether solution containing about 4.5% of boron trifluoride. The temperature rises as a result of the exothermic reaction and external cooling with ice water is applied so as to keep the temperature between about 50° C. and 75° C. during a reaction period of about 3 hours. About 370 parts of the resulting glycerol-epichlorhydrin condensate are dissolved in 900 parts of dioxane containing about 300 parts of sodium aluminate. While agitating, the reaction mixture is heated and refluxed at 93° C. for 9 hours. After cooling to atmospheric temperature, the insoluble material is filtered from the reaction mixture and low boiling substances removed by distillation to a temperature of about 205° C. at 20 mm. pressure. The glycidyl polyether, in amount of 261 parts, is a pale yellow, viscous liquid. It has an epoxide value of 0.645 epoxide equivalent per 100 grams and the molecular weight is 320 as measured ebullioscopically in a dioxane solution. The 1,2-epoxy equivalency is 2.1 and the epoxide equivalent weight is 155.

In executing the process of the invention, it is desirable to have the glycidyl polyether in a mobile liquid condition when the diamine curing agent is added in order to facilitate mixing. The glycidyl polyethers of polyhydric phenols are generally very viscous to solid materials at ordinary temperature. With those which are liquid, but too viscous for ready mixing, they are either heated to reduce the viscosity, or have a liquid solvent added thereto in order to provide fluidity. Normally solid members are likewise mixed with a liquid solvent. Various solvents are suitable for achieving fluidity of the glycidyl polyethers. These may be volatile solvents which escape from the polyether compositions containing the diamine by evaporation before or during the curing such as ketones like acetone, methyl ethyl ketone, methyl isobutyl ketone, isophorone, etc.; esters such as ethyl acetate, butyl acetate, Cellosolve acetate (ethylene glycol monoacetate), methyl Cellosolve acetate (acetate of ethylene glycol monomethyl ether), etc.; ether alcohols such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc., and/or alcohols such as ethyl, isopropyl or n-butyl alcohol. Solvents which remain in the cured compositions may also be used, such as diethylphthalate, dibutylphthalate, or liquid mono-epoxy compounds including glycidyl allyl ether, glycidyl phenyl ether, styrene oxide, 1,2-hexylene oxide, and the like, as well as cyano-substituted hydrocarbons, such as acetonitrile, propionitrile, adiponitrile, benzonitrile, and the like. It is also convenient to employ a glycidyl polyether of a dihydric phenol in admixture with a normally liquid glycidyl polyether of a polyhydric alcohol. In such cases, the amount of diamine added and commingled is based on the average epoxide equivalent weight of the glycidyl polyether mixture.

Various other ingredients may be mixed with the glycidyl polyether subjected to cure with the N,N-dialkyl-1,3-propanediamine including pigments, dyes, plasticizers, compatible resins, and the like.

One important application of the invention is in preparation of protective surface coatings. The diamines convert the glycidyl polyethers to hard, tough, infusible, and chemically resistant resins either at room temperature or at temperatures generally used in preparing baked surface coatings. This use of the resinous products as protective films is an important aspect of the invention since the cured resins are very resistant against chemical action upon being contacted with various corrosive substances.

Another important application of the invention is for potting purposes where miniature electrical circuits are embedded in the resin and the resin not only holds the components of the electrical circuit in place, but also insulates one part from another. The invention is ideally suited for this purpose. The mixture of diamine and polyether cures at low temperature without pressure, and shrinks very little during the curing operation. The cured resins adhere well to all parts, metal or otherwise; they possess good electrical properties; and the cure is so tight that the resulting resins are tough enough to withstand extreme changes of temperature (thermal shock) without shattering or cracking.

The invention is also very useful for adhesive purposes since cure is obtained at room temperature without pressure and excellent bonding of various combinations of materials is obtained, including high strength bonds between metal and metal.

For the purpose of illustrating the invention and demonstrating the unusual character thereof, the following examples are given, but it is to be understood that the invention is not limited to details described therein. The parts and percentages are by weight.

*Example 1*

Tests were conducted on the curing action of N,N-diethyl-1,3-propanediamine in comparison with a variety of other amines. A fluid mixture of 50 parts of Polyether C and 50 parts of Polyether F having an average epoxide equivalent weight of 250 was used. To this mixture were added 10 and 15 parts of the amines listed in the table below per 100 parts of mixture. The amines were stirred into the mixture and then the compositions were allowed to stand for 24 hours at 25° C., after which the Barcol hardness was determined where possible. In the table below under the column headed "Barcol hardness," the numerical value indicates the measured value while the notation "Not set" indicates the composition remained fluid, and the notation "Soft" indicates the composition was so soft that the Barcol hardness was not measurable.

| Amine | Parts Amine Per 100 Parts Mixture | Mols Amine Per Epoxide Equivalent Weight of Mixture | Barcol Hardness |
|---|---|---|---|
| N,N-Diethyl-1,3-propanediamine. | 10 | 0.25 | 37. |
| Do. | 15 | 0.37 | 77. |
| Diethylamine. | 10 | 0.34 | Soft. |
| Do. | 15 | 0.51 | Do. |
| Dibutylamine. | 10 | 0.19 | Not set. |
| Do. | 15 | 0.29 | Do. |
| Cyclohexylamine. | 10 | 0.25 | Soft. |
| Do. | 15 | 0.38 | Do. |
| Benzylamine. | 10 | 0.23 | Do. |
| Do. | 15 | 0.35 | Do. |
| Tetramethylpiperazine. | 10 | 0.18 | Not set. |
| Do. | 15 | 0.26 | Soft. |
| N,N'-Diisopropyl-1,3-propanediamine. | 10 | 0.16 | Not set. |
| Do. | 15 | 0.24 | Soft. |
| 1-Piperidino-3-propylaminopropane. | 10 | 0.18 | Do. |
| Do. | 15 | 0.26 | Do. |

*Example 2*

The excellent performance of the curing agent of the invention in a glycidyl polyether composition employed for adhesive purposes wherein very high shear strength was obtained, the resin-forming fluid composition consisted of 75 parts of Polyether B, 25 parts of Polyether F, and 12 parts of allyl glycidyl ether. Adhesive compositions for testing were prepared by adding and mixing 10 or 15 parts of the amines listed in the table below per 100 parts of the fluid composition. Blocks made of linen sheets laminated together with phenolic resin were employed for the test. The adhesive composition was spread on a one-inch square surface of each of two carefully cleaned blocks with the aid of a doctor blade having a clearance of 0.005 inch. The adhesive coated surfaces of the blocks were then united and the joined blocks were placed in a constant temperature room set at 77° F. After 6 days' time, the blocks were subjected to the block shear test of the Army-Navy-Civil Committee on Aircraft Design Criteria: "Wood Aircraft Inspection and Fabrication," ANC–19 (December 20, 1943) discussed in an article by R. C. Rinker and G. M. Kline, Modern Plastics, vol. 23, p. 164, 1945.

| Amine | Added Percent Amine | Shear Strength in Lbs. per Sq. In. |
| --- | --- | --- |
| N,N-diethyl-1,3-propanediamine | 10 | 3,740 |
| Do | 15 | 3,930 |
| 1,3-Propanediamine | 10 | 2,275 |
| Do | 15 | 2,045 |
| N,N'-diethyl-1,3-butanediamine | 10 | 1,345 |
| Do | 15 | 900 |
| Tetraethylammonium hydroxide | 10 | No strength |
| Do | 15 | 35 |

*Example 3*

For the purpose of testing the curing agent of the invention with several glycidyl polyethers, 50% solutions of Polyether C and Polyether D and a 40% solution of Polyether E in 50-50 mixtures of xylene and the acetate of monomethyl ether of ethylene glycol were prepared. N,N-diethyl-1,3-propanediamine was added to each solution in the amounts stated in the table below. The solutions containing the curing agent were spread on glass panels and after drying by evaporation for ½ hour, were baked at 150° C. for 30 minutes in an air oven. The resulting cured films were hard, clear and tough, and resistant to solution by organic solvents. The toughness was determined by plowing a continuous ribbon from the panel with a knife point. Brittle films shatter into chips when so treated. The solvent resistance was determined by placing a drop of toluene on the film for 15 minutes and observing whether any softening occurred.

| Polyether | Parts Amine per 100 Parts Polyether | Mols Amine per Epoxide Equiv. Wt. Polyether | Scratch Test | Softened by Toluene |
| --- | --- | --- | --- | --- |
| C | 20 | 0.67 | Tough | No |
| D | 6 | 0.54 | do | No |
| E | 4 | 0.78 | do | No |

*Example 4*

Different proportions of N,N'-diethyl-1,3-propanediamine were tested in curing a composition for adhesive purposes. The resin-forming mixture was prepared by dissolving 8 parts of powdered polyvinyl acetate (Vinylite AYAF) in 15 parts of allyl glycidyl ether and then 85 parts of Polyether B warmed to about 150° F. were added. Finally, 30 parts of fine asbestos fiber (Johns-Manville 7TF2) were introduced with thorough mixing. To the spreadably fluid mixture were added and mixed the proportions of N,N-diethyl-1,3-propanediamine noted in the table below. In like manner to the description given in Example 2, the adhesive compositions were spread on clean aluminum blocks which were then joined and cured at 77° F. for 136 hours. The shear strength in p. s. i. (pounds per square inch) of the joined blocks was determined at both 77° F. and 180° F. The Izod impact strength at 77° F. was also determined in accordance with ASTM method D950–47T.

| Parts Amine per 100 Parts Resin-Forming Mixture | Mols Amine per Equiv. Wt. of Glycidyl Polyether | Shear Strength, p. s. i. | | Izod Impact Strength, Ft.-lbs./sq. inch |
| --- | --- | --- | --- | --- |
| | | at 77° F. | at 180° F. | |
| 4.5 | 0.17 | 3,460 | 2,790 | 14.2 |
| 5.8 | 0.23 | 3,230 | 3,510 | 14.9 |
| 7.3 | 0.28 | 4,020 | 3,460 | 8.7 |
| 8.7 | 0.34 | 3,000 | 4,450 | 7.7 |

*Example 5*

The use of various curing temperatures and times will be illustrated in adhesive use of N,N-diethyl-1,3-propanediamine as curing agent. The resin-forming composition was the same as described in Example 4. The amine in the amounts tabulated below was added and mixed with the composition. Clean aluminum blocks were spread with the adhesive as described in Example 2 and heated for curing at the temperatures and times noted in the following table. Shear strengths were determined at the noted temperatures. The Izod impact strengths were also run, but in all cases were higher than the limit of the testing machine in being greater than 15 ft.-lbs. per square inch.

| Parts Amine Per 100 Parts Resin-Forming Mixture | Mols Amine per Eq. Wt. of Polyether | Curing Conditions | | Shear Strength, p. s. i. | | |
| --- | --- | --- | --- | --- | --- | --- |
| | | Temp., °F. | Time, Hrs. | at 70° F. | at 77° F. | at 180° F. |
| 8 | 0.23 | 125 | 48 | 2,220 | 3,330 | 2,860 |
| 10 | 0.28 | 125 | 48 | 2,450 | 3,070 | 3,110 |
| 8 | 0.23 | 150 | 4.5 | 2,450 | 3,680 | 3,570 |
| 10 | 0.28 | 150 | 4.5 | 2,220 | 3,050 | 3,910 |
| 8 | 0.23 | 200 | 2 | 2,710 | 3,560 | 2,330 |
| 10 | 0.28 | 200 | 2 | 2,600 | 3,660 | 1,650 |
| 8 | 0.23 | 300 | 0.25 | 2,760 | 3,870 | |

*Example 6*

The extent of "tightness" of cure of glycidyl polyethers cured with amine curing agents can be determined accurately by subjecting the formed resin to a thermal shock test. The glycidyl polyether in admixture with the curing agent is placed in a cup having the shape of a truncated cone made of polyethylene resin. A one-half inch steel cube is suspended in the center of the resin-forming composition which is cured. The polyethylene cup is removed and the resin sample is obtained having a truncated cone shape of about two inches high with a lower diameter of about 1¼ inches and an upper diameter of about 1½ inches.

The resin sample containing the steel cube is subjected to repeated variations of low and high temperature. The fully cured resin has very high inherent strength, but if not cured fully, cracks will appear during the thermal shock treatment owing to the fact that the strains set up by the difference in thermal expansion of the steel cube and the resin are greater than the strength of the resin.

The thermal shock test is performed by thrusting the resin sample into crushed dry ice for an hour where the temperature reaches about −70° C. The sample is then removed and allowed to warm up by standing in open air at room temperature for one hour. This treatment is repeated three times and then the sample is placed in an oven with circulating air at 200° C. for an hour period. The sample is removed and allowed to cool in open air at room temperature for an hour after which the heating to 200° C. and subsequent cooling is repeated.

The above-described thermal shock test was used on the resin from Polyether A cured with an added 5% of N,N-dimethyl-1,3-propanediamine at the temperature and times tabulated below. For comparison, a resin obtained from Polyether A to which had been added 5% of diethylenetriamine was also tested. The results are given below.

| Amine | Mols Amine per Epoxide Eq. Wt. of Polyether | Cure Time at 100° C., min. | Thermal Shock Test |
|---|---|---|---|
| N,N-dimethyl-1,3-propanediamine | 0.13 | 30 | Passed. |
| Do | 0.13 | 45 | Do. |
| Do | 0.13 | 60 | Do. |
| Diethylenetriamine | 0.09 | 30 | Failed. |

*Example 7*

For purpose of comparison, a test was made with N,N-diethyl-1,2-ethanediamine. Five parts of N,N-diethyl-1,2-ethanediamine were added to and mixed with 100 parts of Polyether A. The mixture was poured into a cup having the shape of a truncated cone made of polyethylene resin with a one-half inch steel cube suspended in the center thereof as described in Example 6. The assembly was placed in an air oven at 65° C. for 4½ hours. The resin appeared to have been cured hard, but upon thrusting the resin sample into crushed Dry Ice so the temperature reached about −70° C. and then removing it to room temperature environment, the resin sample was found to contain numerous cracks which showed failure of cure.

In contrast, a corresponding mixture was prepared by adding five parts of N,N-diethyl-1,3-propanediamine to 100 parts of Polyether A. The mixture was also poured into a polyethylene cup containing the suspended steel cube as described above. Upon being placed in an air oven at 65° C., the mixture cured to a hard resin in only 2¼ hours. Furthermore, the resin sample showed no cracks or other evidence of failure of cure upon being subjected to three cycles of thermal shock which involved cooling to −70° C. and warming to room temperature as described above.

We claim as our invention:

1. A process for producing a resinous product which comprises commingling an N,N-dialkyl-1,3-propanediamine wherein the alkyl groups contain 1 to 2 carbon atoms with glycidyl polyether of a member of the group consisting of a polyhydric phenol and a polyhydric alcohol, said polyether having a 1,2-epoxy equivalency greater than 1.0, amount of 0.05 to 1 mol of the amine per epoxide equivalent weight of the polyether, and curing the mixture at about 20° C. to 250° C. to a hard resinous product.

2. The hard resinous product obtained according to the process of claim 1.

3. A process for producing a resinous product which comprises commingling an N,N-dialkyl-1,3-propanediamine wherein the alkyl groups contain 1 to 2 carbon atoms with a glycidyl polyether of a dihydric phenol having a 1,2-epoxy equivalency between 1.0 and 2.0 in amount of 0.05 to 1 mol of the amine per epoxide equivalent weight of the polyether, and curing the mixture at about 20° C. to 250° C. to a hard resinous product.

4. The hard resinous product obtained according to the process of claim 3.

5. A process for producing a resinous product which comprises commingling N,N-diethyl-1,3-propanediamine with a glycidyl polyether of 2,2-bis(4-hydroxyphenyl)propane having a 1,2-epoxy equivalency between 1.0 and 2.0 and an epoxide equivalent weight of about 175 to 400 in amount of 0.15 to 0.4 mol of the amine per epoxide equivalent weight of the polyether, and curing the mixture at about 20° C. to 150° C. to a hard resinous product.

6. The hard resinous product obtained according to the process of claim 5.

7. A process for producing a resinous product which comprises commingling N,N-dimethyl-1,3-propanediamine with a glycidyl polyether of 2,2-bis(4-hydroxyphenyl)propane having a 1,2-epoxy equivalency between 1.0 and 2.0 and an epoxide equivalent weight of about 175 to 400 in amount of 0.15 to 0.4 mol of the amine per epoxide equivalent weight of the polyether, and curing the mixture at about 20° C. to 150° C. to a hard resinous product.

8. The hard resinous product obtained according to the process of claim 7.

HERBERT A. NEWEY.
EDWARD C. SHOKAL.

References Cited in the file of this patent

FOREIGN PATENTS

| Number | Country | Date |
|---|---|---|
| 251,647 | Switzerland | Sept. 1, 1948 |